(12) United States Patent
Isaacs et al.

(10) Patent No.: US 10,967,788 B2
(45) Date of Patent: Apr. 6, 2021

(54) CHARGE PORT LOCATING ASSEMBLY AND METHOD

(71) Applicant: Ford Global Technologies, LLC, Dearborn, MI (US)

(72) Inventors: Richard Isaacs, Saline, MI (US); Debra Lynn Ross, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 527 days.

(21) Appl. No.: 15/966,307

(22) Filed: Apr. 30, 2018

(65) Prior Publication Data
US 2019/0329706 A1 Oct. 31, 2019

(51) Int. Cl.
*B60Q 9/00* (2006.01)
*B60K 37/02* (2006.01)
*B60L 53/14* (2019.01)

(52) U.S. Cl.
CPC ............... *B60Q 9/00* (2013.01); *B60K 37/02* (2013.01); *B60K 2370/152* (2019.05); *B60K 2370/16* (2019.05); *B60L 53/14* (2019.02); *B60L 2250/16* (2013.01)

(58) Field of Classification Search
CPC ... Y02T 90/14; Y02T 10/7005; Y02T 90/128; B60L 11/1818; B60L 11/1846; B60L 30/12; B60L 30/14; B60O 7/0047
See application file for complete search history.

(56) References Cited

U.S. PATENT DOCUMENTS

| | | | |
|---|---|---|---|
| D309,902 S | 8/1990 | Schneider | |
| D419,196 S | 1/2000 | Lewis et al. | |
| D422,315 S | 4/2000 | Bosack | |
| 8,816,637 B2 | 8/2014 | Martin et al. | |
| 2009/0043449 A1* | 2/2009 | Matsuura | G06Q 40/08 701/36 |
| 2010/0102945 A1 | 4/2010 | Watson et al. | |
| 2012/0048945 A1* | 3/2012 | Demma | B60R 13/10 235/492 |
| 2012/0176231 A1* | 7/2012 | Skaff | B60K 35/00 340/439 |
| 2012/0249065 A1* | 10/2012 | Bissonette | B60L 11/184 320/109 |
| 2013/0158797 A1* | 6/2013 | Fukano | E02F 9/264 701/36 |

* cited by examiner

*Primary Examiner* — Nabil H Syed
*Assistant Examiner* — Cal J Eustaquio
(74) *Attorney, Agent, or Firm* — David Kelley, Esq.; Carlson, Gaskey & Olds, P.C.

(57) ABSTRACT

An example locating assembly includes, among other things, a display within an electrified vehicle, a vehicle symbol presented on the display, and a charge port symbol presented on the display. The charge port symbol is positioned relative to the vehicle symbol to indicate a position of a charge port. An example locating method includes displaying a vehicle symbol and a charge port symbol on a display of an electrified vehicle. The charge port symbol is positioned relative to the vehicle symbol to indicate a position of a charge port.

20 Claims, 2 Drawing Sheets

CHARGE PORT LOCATING ASSEMBLY AND METHOD

TECHNICAL FIELD

This disclosure relates generally to a display of an electrified vehicle. In particular, the disclosure relates to a display that indicates a location of a charge port on the electrified vehicle.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electrified vehicles (HEVs), plug-in hybrid electrified vehicles (PHEVs), fuel cell vehicles (FCVs), and battery electrified vehicles (BEVs). Some electrified vehicles, like PHEVs and BEVs, can charge the traction battery from an external power source. A user can plug a charger into a charge port of the electrified vehicle so that power can move from an external charging system to the electrified vehicle.

There is no universal standard for where the charge port is located on electrified vehicles. Some electrified vehicles can include a charge port within, for example, a front fender. Other electrified vehicles can include a charge port within a rear fender, a rear tail light, or in some other area. Some electrified vehicles have more than one charge port located in different areas. One charge port could be at the front of the electrified vehicle and used, for example, for AC charges. Another charge port could be located at the rear of the vehicle and used for DC fast charges.

An operator of the electrified vehicle may not know, or may forget, where the charge port is located on an electrified vehicle. This could lead to the operator positioning the electrified vehicle in an inconvenient location relative to an external charging system.

SUMMARY

An exemplary non-limiting embodiment of a locating assembly according to an exemplary aspect of the present disclosure includes, among other things, a display within an electrified vehicle, a vehicle symbol presented on the display, and a charge port symbol presented on the display. The charge port symbol is positioned relative to the vehicle symbol to indicate a position of a charge port.

In a further non-limiting embodiment of the foregoing assembly, the vehicle symbol is a battery state of charge icon.

In a further non-limiting embodiment of any of the foregoing assemblies, the vehicle symbol is battery shaped.

In a further non-limiting embodiment of any of the foregoing assemblies, a vertically upper end of the vehicle symbol represents a front portion of the electrified vehicle, and a vertically lower end of the vehicle symbol represents a rear portion of the electrified vehicle.

In a further non-limiting embodiment of any of the foregoing assemblies, the vehicle symbol includes a visual indicator representing a state of charge of a traction battery of the electrified vehicle.

In a further non-limiting embodiment of any of the foregoing assemblies, the vehicle symbol represents an overhead view of the electrified vehicle.

In a further non-limiting embodiment of any of the foregoing assemblies, the charge port symbol represents a position of the charge port along a longitudinal axis of the electrified vehicle.

In a further non-limiting embodiment of any of the foregoing assemblies, the charge port symbol is a first charge port symbol and the charge port is a first charge port. The assembly further includes a second charge port symbol presented on the display. The second charge port symbol is positioned relative to the vehicle symbol to indicate the position of a second charge port.

In a further non-limiting embodiment of any of the foregoing assemblies, the first charge port is an AC charge port, and the second charge port is a DC charge port.

In a further non-limiting embodiment of any of the foregoing assemblies, a color of the first charge port symbol is different than a color of the second charge port symbol.

In a further non-limiting embodiment of any of the foregoing assemblies, a shape of the first charge port symbol is different than a shape of the second charge port symbol.

A locating method according to another exemplary, non-limiting embodiment of the present disclosure includes displaying a vehicle symbol and a charge port symbol on a display of an electrified vehicle. The charge port symbol is positioned relative to the vehicle symbol to indicate a position of a charge port.

A further non-limiting embodiment of the foregoing method includes altering the vehicle symbol in response to a state of charge of a traction battery of the electrified vehicle.

A further non-limiting embodiment of any of the foregoing methods includes representing a front portion of the vehicle with a vertically upper end of the vehicle symbol and a rear portion of the vehicle with a vertically lower end of the vehicle symbol.

In a further non-limiting embodiment of any of the foregoing methods the vehicle symbol represents an overhead view of the electrified vehicle.

A further non-limiting embodiment of any of the foregoing methods includes displaying the charge port symbol relative to the vehicle symbol such that the charge port symbol represents a position of the charge port along a longitudinal axis of the electrified vehicle.

In a further non-limiting embodiment of any of the foregoing methods, the charge port symbol is a first charge port symbol and the charge port is a first charge port. The method further includes displaying a second charge port symbol presented on the display. The second charge port symbol is positioned relative to the vehicle symbol to indicate the position of a second charge port.

In a further non-limiting embodiment of any of the foregoing methods, the first charge port is an AC charge port and the second charge port is a DC charge port.

A further non-limiting embodiment of any of the foregoing methods includes displaying the first charge port symbol in a first color and displaying the second charge port symbol in a different, second color.

In a further non-limiting embodiment of any of the foregoing methods, a shape of the first charge port symbol is different than a shape of the second charge port symbol.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a display within an electrified vehicle. The display indicates a location of a charge port of the electrified vehicle. A user can refer to the display to learn the location of the charge port, which can, among other things, assist the user when positioning the electrified vehicle for a charge from an external power source.

Figure 1:
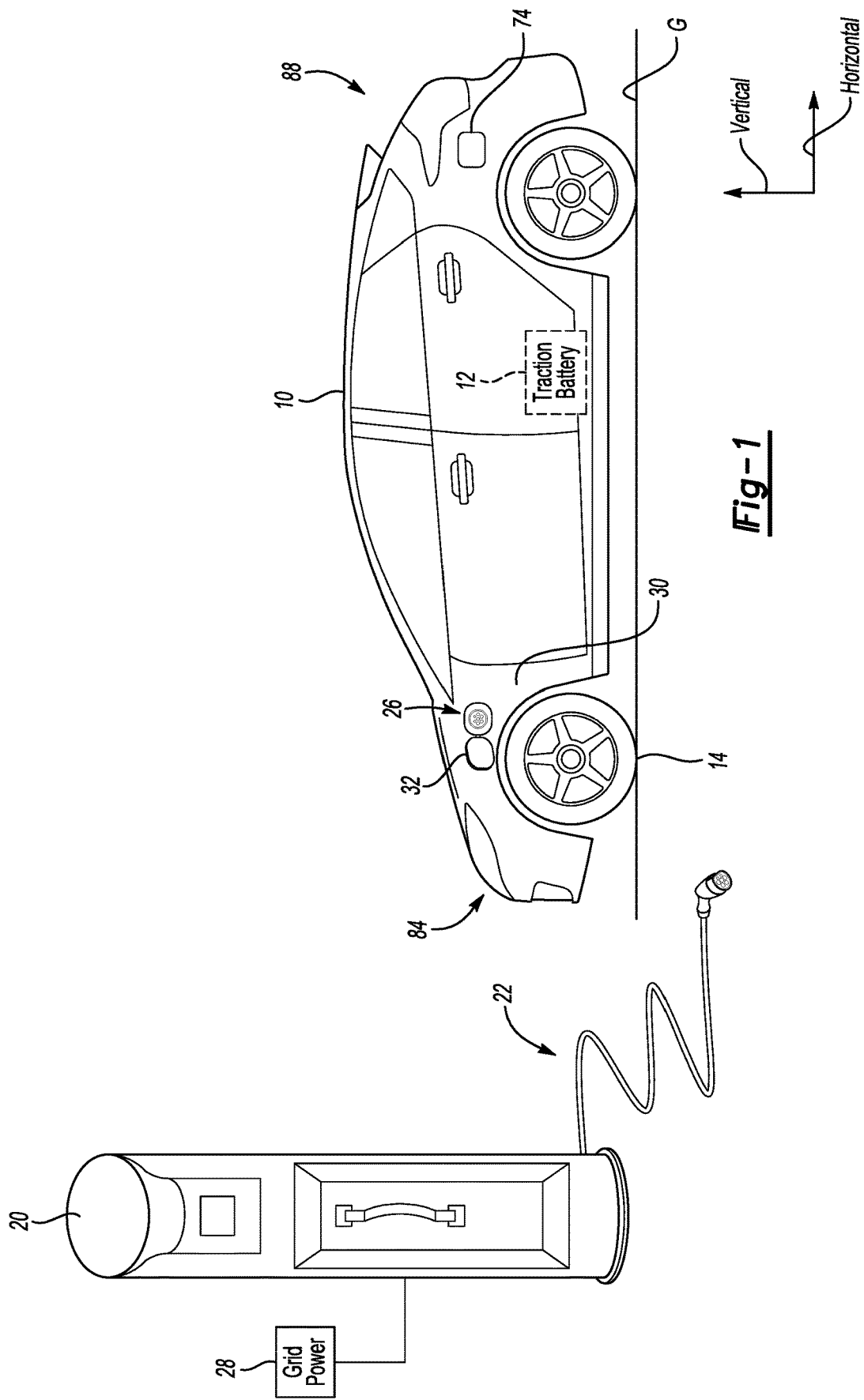
FIG. 1 illustrates a side and partially schematic view of an electrified vehicle near a charging station.

Referring to FIG. 1, an exemplary electrified vehicle 10 is a plug-in hybrid electric vehicle (PHEV) that includes a traction battery 12. A power-split powertrain of the vehicle 10 employs a first drive system and a second drive system. The first and second drive systems generate torque to drive one or more sets of vehicle wheels 14. The first drive system can include, in combination, an internal combustion engine and a generator. The second drive system can include at least a motor, the generator, and the traction battery 12.

Although described as a PHEV, the electrified vehicle 10, in other examples, could be another type of electrified vehicle, such as an all electric vehicle. An all-electric vehicle can also include a traction battery that powers an electric machine, which converts electric power from the traction battery into torque to drive the wheels of the vehicle.

From time to time, charging the traction battery 12 is required or is otherwise desired. When the vehicle 10 is operating during a drive cycle, power from regenerative braking can sometimes be used to charge the traction battery 12. When the vehicle 10 is stationary, an external power source, here a charging station 20, can be used to charge the traction battery 12.

In an example, during a charge of the traction battery 12 from the charging station 20, a charger 22 is physically coupled to a charge port 26 on the vehicle 10. Power from an external power source, such as grid power 28, can then move through the charger 22 to the charge port 26 and then to the traction battery 12.

To charge the traction battery 12 from the charging station 20, the vehicle 10 needs to be positioned relative to the charging station 20 so that the charger 22 can reach the charge port 26. A user in a passenger cabin of the vehicle 10 typically drives the vehicle 10 into such a position. To effectively position the vehicle 10, the user driving the vehicle 10 benefits from knowing where the charge port 26 is located, especially in situations where the charger 22 cannot reach all areas of the vehicle 10.

The charge port 26, in the exemplary embodiment, is disposed within a front driver side fender 30 of the vehicle 10. Thus, positioning the vehicle 10 such that the front driver side fender 30 is directed toward the charging station 20 would likely be more desirable than if, for example, the rear passenger side fender of the vehicle 10 were directed toward the charging station 20.

After positioning the vehicle 10 relative to the charging station 20, the user can exit the passenger cabin, open a door 32 associated with the charge port 26, and engage the charger 22 with the charge port 26. Grid power 28 can then charge the traction battery 12. Any type of vehicle incorporating a charge port could potentially benefit from the teachings of this disclosure.

Figure 2:
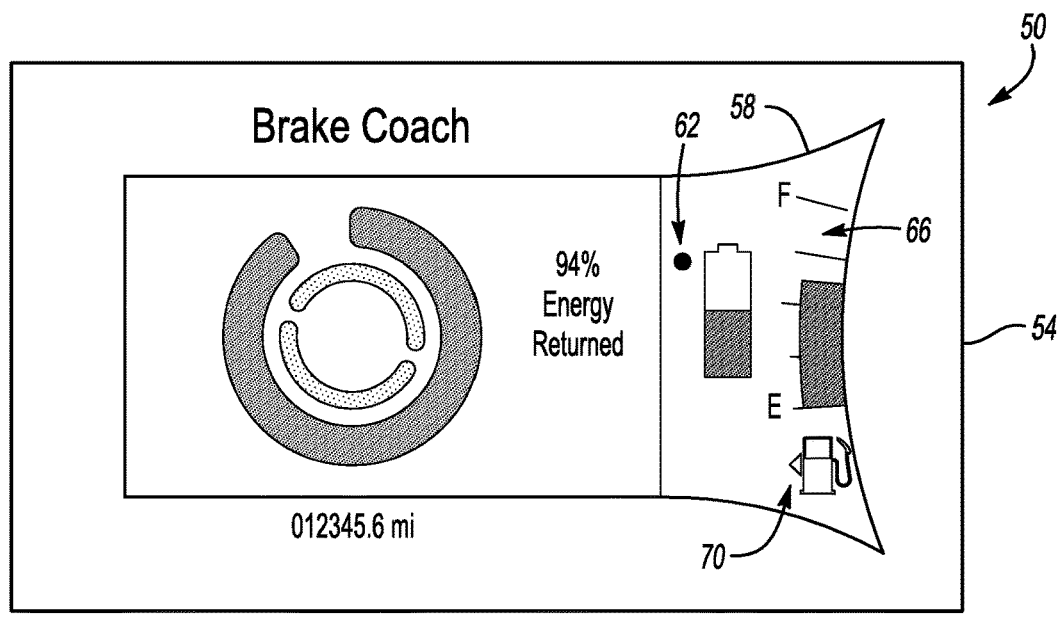
FIG. 2 illustrates a close-up view of an area of a display within a passenger cabin of the electrified vehicle of FIG. 1.
Figure 2:
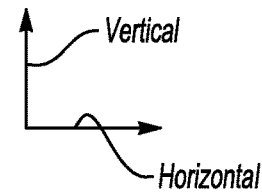
Figure 3:
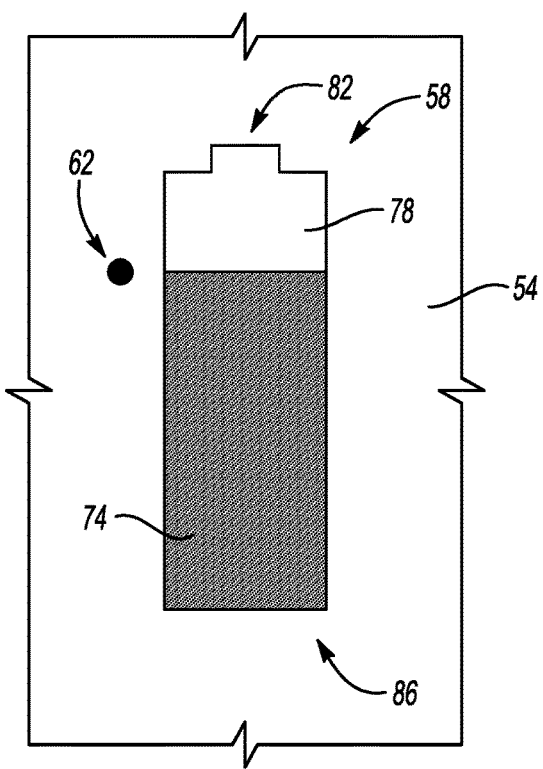
FIG. 3 illustrates a close-up view of a portion of the display of FIG. 2 that includes a vehicle symbol and a charge port symbol.

With reference now to FIGS. 2 and 3 and continuing reference to FIG. 1, the example vehicle 10 includes a charge port locating assembly 50 within a passenger cabin of the electrified vehicle 10. The locating assembly 50 helps a user identify a location of the charge port 26 on the electrified vehicle 10.

In an exemplary non-limiting embodiment, the locating assembly 50 is part of a display 54. Areas of the display 54 can be illuminated to reveal information to the user. The display 54 can be within a dash or instrument panel, within a center stack, a heads-up display, or in some other area of the passenger compartment the electrified vehicle 10. The display 54 can be a type of liquid crystal display (LCD), can comprise organic light emitting diodes (OLED), or can be some other type of display. The display 54 can be touch sensitive.

In this example, the display 54 includes a vehicle symbol 58, a charge port symbol 62, a liquid fuel gauge 66, and a liquid fuel inlet indicator 70. The liquid fuel gauge 66 presents a visual representation to the user of an amount of liquid fuel (i.e., gasoline) within the vehicle 10. The liquid fuel inlet indicator 70 is, in this example, an arrow pointing to a driver side of the vehicle 10, which reveals to the user that a liquid fuel inlet 74 is on a driver side of the vehicle 10. The engine of the vehicle 10 is powered by the liquid fuel. Other vehicles that do not include an engine may not include a fuel inlet.

The locating assembly 50 includes the vehicle symbol 58 and charge port symbol 62 portions of the display 54. The vehicle symbol 58, in the exemplary embodiment, is a battery state of charge icon having a battery shape. The vehicle symbol 58 provides a visual indication to the user of a state of charge of the traction battery 12.

The exemplary vehicle symbol 58 includes a more illuminated region 74 and a less illuminated region 78. Both are within an interior of the vehicle symbol 58, which is bounded by an outer periphery having the battery shape. In other examples, the vehicle symbol 58 could have a shape other than the battery shape, such as a profile of a vehicle viewed from overhead.

As the state of charge of the traction battery 12 increases, the more illuminated region 74 is increased in size relative to the less illuminated region 78. In some examples, a percent of the interior having the more illuminated region 74 represents a state of charge of the traction battery 12. For example, if the more illuminated region 74 covers, say, seventy-five percent of the interior of the vehicle symbol 58, the user can interpret the traction battery 12 as being seventy-five percent charged.

In the exemplary non-limiting embodiment, the vehicle symbol 58 corresponds to an overhead view of the electrified vehicle 10. The vehicle symbol 58 is oriented such that a vertically upper end 82 represents a front portion 84 of the electrified vehicle 10, and a vertically lower end 86 of the vehicle symbol 58 represents a rear portion 88 of the electrified vehicle 10. Vertical, for purposes of this disclosure, is with reference to ground G and a general orientation of the electrified vehicle 10 during operation.

The charge port symbol 62 is an illuminated area of the display 54 positioned relative to the vehicle symbol 58 in a position corresponding generally to the position of the charge port 26 if the vehicle 10 were to be viewed from overhead. The charge port symbol 62 does not overlap with the vehicle symbol 58 in this example. In another example, at least some of the charge port symbol 62 overlaps with some of the vehicle symbol 58.

In FIGS. 2 and 3, the charge port symbol 62 is positioned relative to the vehicle symbol 58 to indicate that the charge port 26 is within the front driver side fender 30 of the electrified vehicle 10. This is because the charge port symbol 62 is near the upper, left hand side of the vehicle symbol 58.

The user, from within the passenger cabin, can view the locating assembly 50 to understand a positioning of the charge port 26. The user can, for example, view the locating assembly 50 as the user is driving the electrified vehicle 10 to the charging station 20. Because the user recognizes from the charge port symbol 62 that the charge port 26 is within the front driver side fender 30, the user can position the electrified vehicle 10 in an appropriate manner for charging the electrified vehicle 10 from the charging station 20. The user does not need to exit the passenger compartment of the electrified vehicle 10 to view a physical location of the charge port 26. Instead, the user can rely on the charge port locating assembly 50.

The charge port symbol 62 indicates to the user not only that the charge port 26 is on the driver side, but also that the charge port 26 is located near the front portion 84 of the vehicle 10. The charge port symbol 62 can thus provide an indication of where the charge port 26 is located along a longitudinal axis of the vehicle 10. The longitudinal axis of the vehicle 10 extends from the front portion 84 to the rear portion 88.

An example locating method used in connection with the locating assembly can include displaying the vehicle symbol 58 and the charge port symbol 62 on the display 54 of the electrified vehicle 10. How the charge port symbol 62 is positioned relative to the vehicle symbol 58 on the display 54 indicates a position of the charge port 26.

Figure 4:
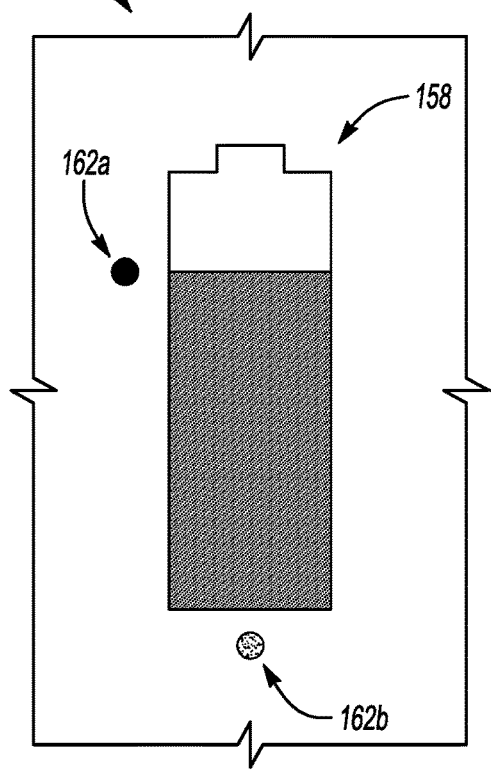
FIG. 4 illustrates the portion of the display shown in FIG. 3 according to another exemplary aspect of the present disclosure.

Referring now to FIG. 4, in another exemplary, non-limiting embodiment of the present disclosure, a charge port locating assembly 150 includes a vehicle symbol 158, a first charge port symbol 162A, and a second charge port symbol 162B. The first charge port symbol 162A can represent a position of a first charge port of an associated electrified vehicle. The second charge port symbol 162B can represent a position of a second charge port of the associated electrified vehicle. Here, the electrified vehicle associated with the charge port locating assembly 150 includes a first charge port within a front driver side fender, and a second charge port at a rear of the electrified vehicle.

The first charge port can, for example, an Alternating Current (AC) charge port configured to receive an AC charge. The second charge port can be a Direct Current (DC) charge port configured to receive a DC charge, such as a DC fast charge.

In such an example, the first charge port symbol 162A can be different than the second charge port symbol 162B to help the user distinguish the location of the AC charge port from the location of the DC charge port. Here, the first charge port symbol 162A is of a first color and the second charge port symbol 162B is of a second color different than the first color.

Another variation could include a shape of the first charge port symbol 162A differing from a shape of the second charge port symbol 162B. For example, the first charge port symbol 162A could be a letter "A" to represent that the first charge port is an AC charge port. Further, the second charge port symbol could be a letter "D" to represent that the second charge port is a DC charge port. Other symbols helping the user to visually differentiate between the two charge ports could be used in other examples.

Features of some of the disclosed examples include a display indicating a position of one or more charge ports on an electrified vehicle. A user can view the display to understand a positioning of the charge port instead of, for example, referencing an owner's manual. The disclosed examples enable a user to understand where the charge ports are located on the electrified vehicle, even when the user is positioned within the passenger compartment of the electrified vehicle. This can be particularly useful where the user is unfamiliar with the electrified vehicle, such as in car sharing or car rental situations.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:
1. A locating assembly, comprising:
    a display within an electrified vehicle;
    a vehicle symbol presented on the display; and
    a charge port symbol presented on the display, the charge port symbol positioned relative to the vehicle symbol to indicate a position of a charge port.
2. The locating assembly of claim 1, wherein the vehicle symbol is a battery state of charge icon.
3. The locating assembly of claim 2, wherein the vehicle symbol is battery shaped.
4. The locating assembly of claim 1, wherein a vertically upper end of the vehicle symbol represents a front portion of the electrified vehicle, and a vertically lower end of the vehicle symbol represents a rear portion of the electrified vehicle.
5. The locating assembly of claim 1, wherein the vehicle symbol includes a visual indicator representing a state of charge of a traction battery of the electrified vehicle.
6. The locating assembly of claim 1, wherein the vehicle symbol represents an overhead view of the electrified vehicle.
7. The locating assembly of claim 1, wherein the charge port symbol represents a position of the charge port along a longitudinal axis of the electrified vehicle.
8. The locating assembly of claim 1, wherein the charge port symbol is a first charge port symbol and the charge port is a first charge port, and further comprising a second charge port symbol presented on the display, the second charge port symbol positioned relative to the vehicle symbol to indicate the position of a second charge port.
9. The locating assembly of claim 8, wherein the first charge port is an AC charge port, and the second charge port is a DC charge port.
10. The locating assembly of claim 8, wherein a color of the first charge port symbol is different than a color of the second charge port symbol.
11. The locating assembly of claim 8, wherein a shape of the first charge port symbol is different than a shape of the second charge port symbol.
12. A locating method, comprising:
    displaying a vehicle symbol and a charge port symbol on a display of an electrified vehicle, the charge port symbol positioned relative to the vehicle symbol to indicate a position of a charge port.
13. The locating method of claim 12, further comprising altering the vehicle symbol in response to a state of charge of a traction battery of the electrified vehicle.

14. The locating method of claim 12, further comprising representing a front portion of the vehicle with a vertically upper end of the vehicle symbol and a rear portion of the vehicle with a vertically lower end of the vehicle symbol.

15. The locating method of claim 12, wherein the vehicle symbol represents an overhead view of the electrified vehicle.

16. The locating method of claim 12, further comprising displaying the charge port symbol relative to the vehicle symbol such that the charge port symbol represents a position of the charge port along a longitudinal axis of the electrified vehicle.

17. The locating method of claim 12, wherein the charge port symbol is a first charge port symbol and the charge port is a first charge port, and further comprising displaying a second charge port symbol on the display, the second charge port symbol positioned relative to the vehicle symbol to indicate the position of a second charge port.

18. The locating method of claim 17, wherein the first charge port is an AC charge port and the second charge port is a DC charge port.

19. The locating method of claim 17, further comprising displaying the first charge port symbol in a first color and displaying the second charge port symbol in a different, second color.

20. The locating method of claim 17, wherein a shape of the first charge port symbol is different than a shape of the second charge port symbol.

\* \* \* \* \*